US009421773B2

(12) United States Patent
Asai et al.

(10) Patent No.: US 9,421,773 B2
(45) Date of Patent: Aug. 23, 2016

(54) PROCESS FOR PRODUCING LIQUID EJECTION HEAD

(71) Applicant: CANON KABUSHIKI KAISHA, Tokyo (JP)

(72) Inventors: Kazuhiro Asai, Kawasaki (JP); Keiji Matsumoto, Kawasaki (JP); Kunihito Uohashi, Yokohama (JP); Shuji Koyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 13/956,607

(22) Filed: Aug. 1, 2013

(65) Prior Publication Data

US 2014/0068940 A1 Mar. 13, 2014

(30) Foreign Application Priority Data

Sep. 11, 2012 (JP) ................................ 2012-199388

(51) Int. Cl.
*B21D 53/76* (2006.01)
*B23P 17/00* (2006.01)
*B41J 2/16* (2006.01)

(52) U.S. Cl.
CPC .............. *B41J 2/1631* (2013.01); *B41J 2/1603* (2013.01); *B41J 2/1629* (2013.01); *B41J 2/1639* (2013.01); *B41J 2/1645* (2013.01); *Y10T 29/49401* (2015.01)

(58) Field of Classification Search
CPC .......... B41J 2/14024; B41J 2/16; B41J 2/175; Y10T 29/49401; Y10T 29/49083; B29C 33/0083
USPC ........ 29/890.1, 890.09; 216/27; 430/311, 320
See application file for complete search history.

(56) References Cited

U.S. PATENT DOCUMENTS 5,331,344 A 7/1994 Miyagawa et al.
7,523,553 B2 * 4/2009 Ohsumi ................ B41J 2/1603 216/27
7,930,824 B2 4/2011 Ohsumi et al.

FOREIGN PATENT DOCUMENTS

JP 4-216952 A 8/1992
JP 2007-230234 A 9/2007

OTHER PUBLICATIONS

Matsumoto et al., U.S. Appl. No. 14/011,940, filed Aug. 28, 2013.

* cited by examiner

*Primary Examiner* — Thiem Phan
(74) *Attorney, Agent, or Firm* — Fitzpatrick, Cella, Harper & Scinto

(57) ABSTRACT

The invention provides a process for producing a liquid ejection head having an ejection orifice forming member in which an ejection orifice for ejecting a liquid has been formed, and a substrate having an energy-generating element for generating energy for ejecting a liquid from the ejection orifice on the side of a front surface thereof, the process includes the steps of providing a film having a support, a first layer and a second layer in this order, arranging the film on the substrate in such a manner that the second layer faces the front surface, detaching the support from the film arranged, forming the ejection orifice in the second layer, and removing at least a part of the first layer from the second layer.

18 Claims, 4 Drawing Sheets

PROCESS FOR PRODUCING LIQUID EJECTION HEAD

BACKGROUND OF THE INVENTION

1. Field of the Invention

The present invention relates to a process for producing a liquid ejection head from which a liquid is ejected.

2. Description of the Related Art

Methods for ejecting an ink on a recording medium to conduct recording include an ink jet recording system. Examples of a process for producing an ink jet recording head include a process of forming a flow path wall and then bonding an orifice plate. Japanese Patent Application Laid-Open No. H04-216952 and Japanese Patent Application Laid-Open No. 2007-230234 describe such a process.

According to the production process of the ink jet recording head described in Japanese Patent Application Laid-Open No. H04-216952, a negative first photosensitive resin layer is first formed on a substrate including an electrothermal conversion element as an energy-generating element generating energy for ejecting a liquid to conduct pattern exposure. A second photosensitive resin layer which will become an orifice plate is then formed on the first photosensitive resin layer. Pattern exposure is conducted for the second photosensitive resin layer having a sensitivity different from that of the first photosensitive resin layer to form an ink ejection orifice. Thereafter, latent image portions of the first and second photosensitive resin layers are removed, thereby producing an ink jet recording head.

According to the production process of the ink jet recording head described in Japanese Patent Application Laid-Open No. 2007-230234, an ink flow path is first formed on a substrate including an electrothermal conversion element as an energy-generating element for generating energy for ejecting a liquid. A negative photosensitive resin which will become an orifice plate is then transferred on the ink flow path. Thereafter, pattern exposure is conducted to form an ink ejection orifice, and a latent image portion of the photosensitive resin is removed, thereby producing an ink jet recording head.

SUMMARY OF THE INVENTION

According to the present invention, there is provided a process for producing a liquid ejection head comprising an ejection orifice forming member in which an ejection orifice for ejecting a liquid has been formed, and a substrate having an ejection-energy-generating element for generating energy for ejecting a liquid from the ejection orifice on the side of a first surface thereof, the process comprising the steps of: (1) providing a film having a support, a first layer and a second layer in this order, (2) arranging the film on the substrate in such a manner that the second layer faces the first surface followed by detaching the support from the film, (3) forming the ejection orifice in the second layer, and (4) removing at least a part of the first layer from the second layer.

Further features of the present invention will become apparent from the following description of exemplary embodiments with reference to the attached drawings.

DESCRIPTION OF THE EMBODIMENTS

Figure 1A:
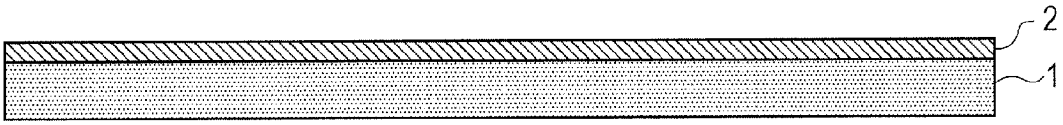
FIGS. 1A and 1B schematically illustrate steps of producing a film used in a production process according to a first embodiment.

Preferred embodiments of the present invention will now be described in detail in accordance with the accompanying drawings.

According to the processes described in Japanese Patent Application Laid-Open No. H04-216952 and Japanese Patent Application Laid-Open No. 2007-230234, when the photosensitive resin formed on the support of the film which will become an orifice plate is transferred on the substrate, a front surface of the substrate comes to directly touch the support of the film. Therefore, minutes irregularities formed on the support of the film are left as transfer traces at a face surface upon the transfer, and the face surface may be damaged in some cases when the support of the film is detached. With the formation of nozzles at a high density and with a high accuracy in recent years, there has been a fear of deteriorating ejection accuracy due to an ink remaining in the minute transfer traces. Therefore, there has been necessity of selecting an expensive film free of minute irregularities on a support thereof and excellent in smoothness.

Thus, it is an object of the present invention to provide a process for producing a liquid ejection head by using a film to form an ejection orifice forming member, by which the influence of minute irregularities existing in a support of the film can be reduced or relieved.

Embodiments of the present invention will hereinafter be described with reference to the drawings.

Incidentally, the same sign is given to components having the same function in the drawings to omit the description thereof in some cases. In the present specification, description is given taking an ink jet recording head as an application example of the present invention. However, the application range of the present invention is not limited thereto. The present invention may also be applied to a liquid ejection head for production of a biochip or printing of an electronic circuit. Examples of the liquid ejection head include a head for production of a color filter in addition to the ink jet recording head.

Figure 4:
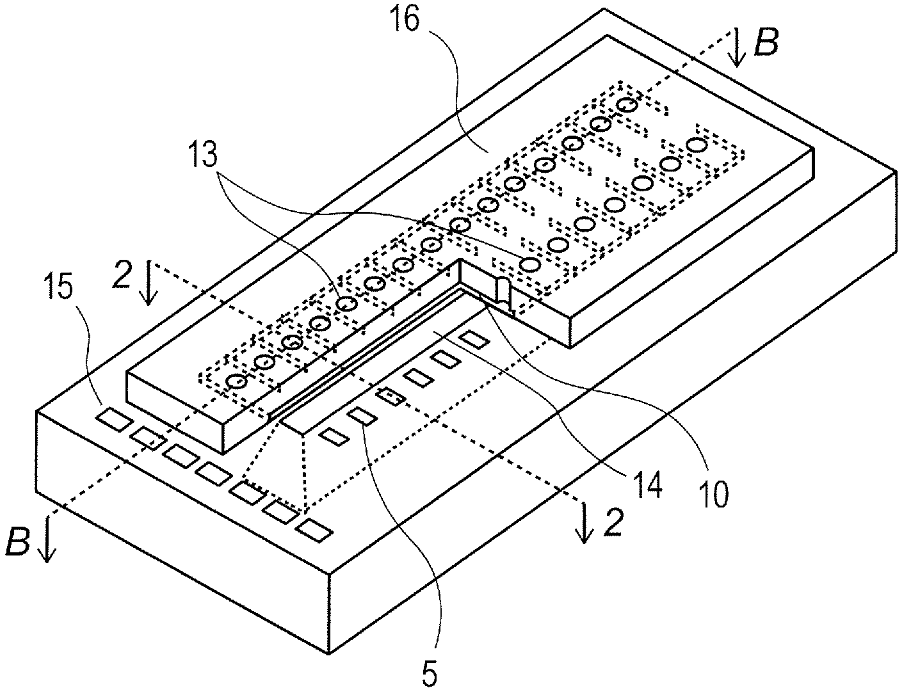
FIG. 4 is a typical perspective view illustrating a constructional example of a liquid ejection head.

FIG. 4 is a typical perspective view illustrating a constructional example of a liquid ejection head. As illustrating in FIG. 4, the liquid ejection head has a substrate 15 which has an ejection-energy-generating element 5 for generating energy utilized for ejecting a liquid such as an ink on the side of a first surface (front surface) thereof, and an ejection orifice 13 from which the liquid such as the ink is ejected is formed. A liquid supply port 14 extending from the first surface (front surface) of the substrate to a second surface (back surface) which is a surface opposite to the first surface is provided in the substrate 15.

In addition, a flow path forming member 16 forming the ejection orifice 13 and a liquid flow path 10 communicating with the ejection orifice is arranged on the substrate 15. The flow path forming member is formed from a flow path wall forming member forming a lateral wall of the liquid flow path 10 and an ejection orifice forming member forming the ejection orifice 13.

For example, an Si wafer having a crystal axis (100) may be used as the substrate 15 having the ejection-energy-generating element 5 and the liquid supply port.

FIGS. 2A to 2G and FIGS. 3A to 3F are sectional views taken along line 2-2 in FIG. 4 and respectively illustrating steps for producing a liquid ejection head according to embodiments of the present invention.

A film used in the steps will hereinafter be described with reference to FIG. 1, and the production processes according to the embodiments will be described in detail with reference to FIGS. 2A to 2G and FIGS. 3A to 3F, respectively. The film used in the present invention has a support, a first layer and a second layer in this order.

First Embodiment

The film is first provided. As illustrated in FIG. 1A, the first layer 2 is formed on the support 1. The first layer favorably contains a soluble resin. An example where the first layer contains a soluble resin will now be described.

Examples of a method for forming the first layer 2 by depositing the soluble resin on the support 1 include a method of forming a coating by, for example, a spin coating method. The thickness of the first layer is favorably 0.5 to 10 μm from the viewpoint of absorbing or relieving the irregularities of the support. The viscosity of a solution prepared by dissolving the soluble resin in a solvent is favorably 5 to 150 CP. Examples of the solvent include propylene glycol methyl ether acetate (PGMEA), tetrahydrofuran (THF), cyclohexanone, methyl ethyl ketone and xylene. These solvents may be used either singly or in any combination thereof.

As the soluble resin, is favorably used a resin soluble by a developer used in development of the second layer 3 which forms an ejection orifice forming member. As the soluble resin, an epoxy resin, an acrylic resin or a urethane resin, which is soluble in an organic solvent, is favorably used. Since the second layer 3 is exposed through the first layer 2 upon exposure for forming an ejection orifice, the soluble resin desirably has excellent permeability (also called light transmissivity). Accordingly, a bisphenol A type or cresol novolak type epoxy resin is favorable as the epoxy resin from the viewpoint of permeability. An alicyclic epoxy resin is also favorable. Poly(methyl methacrylate) is favorable as the acrylic resin. Polyurethane is favorable as the urethane resin.

In addition, the first layer 2 favorably has a function as an anti-reflection coating which reduces multiple reflection interference of light in a resist layer when the second layer 3 is patterned by photolithography. The anti-reflection coating is required to have a low refractive index, transparency and evenness of coating thickness without incurring reduction in the sensitivity of the second layer 3. From this point of view, the soluble resin layer favorably contains a fluorine-containing compound. Examples of the fluorine-containing compound include organic fluorine-containing surfactants. Favorable examples of the organic fluorine-containing surfactants include perfluoroalkyl esters, perfluoroalkyl ethers, perfluorooctanesulfonic acid and perfluorooctanoic acid.

The soluble resin is not insolubilized by exposure in a subsequent step. For example, the soluble resin is favorably the same material as the second layer 3 except that a photosensitizer is not contained because such a resin can be removed at a time upon development.

Examples of the support 1 include a polyethylene terephthalate (PET) film, a polyimide film and a polyamide (aramide) film. The support may be subjected to a releasing treatment for making only the support easy to be detached in a subsequent step. However, since resist release may occur in some cases when the first layer is formed, the releasing treatment is desirably not conducted.

Figure 1B:
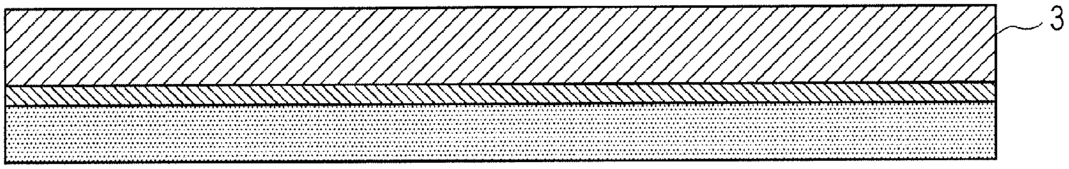

As illustrated in FIG. 1B, the second layer 3 is then formed on the first layer 2. Examples of a method for forming the second layer 3 on the first layer 2 include a spin coating method and a slit coating method (curtain coating method). The slit coating method (curtain coating method) is desirably used from the viewpoint of being hard to mix the second layer 3 with the first layer 2.

The second layer 3 is favorably a first photosensitive resin layer containing a photosensitive resin (first photosensitive resin). An example where the second layer is the first photosensitive resin layer containing the first photosensitive resin will now be described. The first photosensitive resin is required to have high mechanical strength and ink resistance as a material forming an orifice plate. In addition, the resin is favorably applicable in a thickness of 5 to 60 μm as a material forming an ink ejection orifice. For example, a negative photosensitive resin may be used as the first photosensitive resin. Since the thickness of the second layer 3 is an important factor for determining a distance between an ink ejection orifice and an ejection-energy-generating element, the first photosensitive resin is desirably a material capable of forming a layer with good accuracy. From such a point of view, a cationically polymerized cured product of an epoxy resin is favorably used as the first photosensitive resin. The photosensitive resin layer formed of the cationically polymerized cured product of the epoxy resin has excellent strength, adhesion and solvent resistance and also has excellent patterning properties.

Figure 2A:
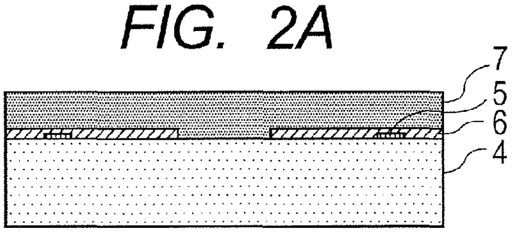
FIGS. 2A, 2B, 2C, 2D, 2E, 2F and 2G schematically illustrate a process for producing a liquid ejection head according to the first embodiment.

As illustrated in FIG. 2A, a second photosensitive resin layer 7 is then formed on a substrate such as a silicon substrate having an ejection-energy-generating element 5. For example, a negative photosensitive resin may be used as the second photosensitive resin layer 7.

For example, an electrothermal conversion element or a piezoelectric element may be used as the ejection-energy-generating element 5. When the electrothermal conversion element is used, ejection energy is generated by heating a liquid in the vicinity of this element to cause the liquid to bring about a change of state. A passivation film 6 as a film for protecting the ejection-energy-generating element is provided.

Examples of a method for forming the second photosensitive resin layer 7 on the substrate 4 include a method of dissolving a resist material (for example, a negative resist) in a proper solvent and forming a coating by, for example, a spin coating method.

The thickness of the second photosensitive resin layer 7 defines the height of an ink flow path and is, for example, 5 to 25 μm.

Figure 2B:
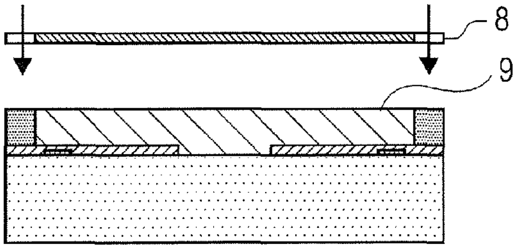

As illustrated in FIG. 2B, the second photosensitive resin layer 7 is then subjected to an exposure treatment by using a mask 8 to form a latent image pattern of an ink flow path having a non-exposed portion 9.

A photolithographic method is used in the formation of the latent image pattern of the ink flow path for accurate positional relation between the ink ejection orifice and the ejection-energy-generating element 5.

Figure 2C:
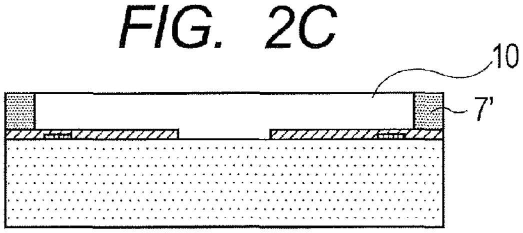

As illustrated in FIG. 2C, the latent image pattern of the second photosensitive resin layer 7 after the exposure treatment is then subjected to a development treatment with a developer, thereby removing an exposed portion to form an ink flow path wall (flow path wall forming member) 7' and an ink flow path 10.

Figure 2D:
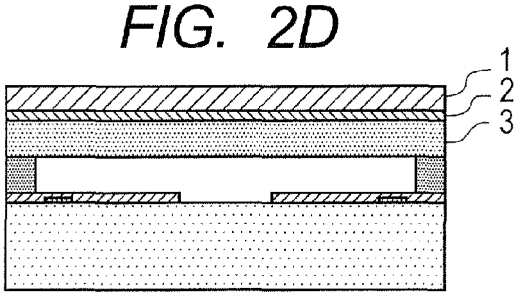

As illustrated in FIG. 2D, the film (also referred to as the lamination film) illustrated in FIG. 1B is then placed on the ink flow wall 7' to transfer the first layer 2 and second layer 3 formed on the support 1. The film is arranged on the substrate in such a manner that a first surface (front surface) of the substrate faces the second layer 3. That is, the film is arranged in such a manner that the second layer faces the first surface of the substrate. Thereafter or concurrently, the support 1 is detached from the film arranged on the substrate.

Examples of a method for arranging the film on the ink flow path wall 7' include a lamination method.

Since the ink flow path 10 is a space and the transfer of the film is a transfer to a hollow structure, the film has to be arranged so as to prevent sagging to the hollow structure upon the transfer. In order to, for example, join the second layer 3 to the ink flow path 10 (ink flow path wall 7'), it is necessary to conduct the transfer at a temperature exceeding the softening temperature of the second layer 3. It is favorable to add a resin binder to the second layer 3 to improve film-forming properties.

Upon the detachment of the support 1, it is desirable to detach the support in such a manner that the first layer 2 does not cause layer separation. Even if the first layer 2 causes layer separation upon the detachment of the support, however, the face surface of the resulting liquid ejection head comes to be protected because the soluble resin of the first layer left on the substrate will be removed later.

Figure 2E:
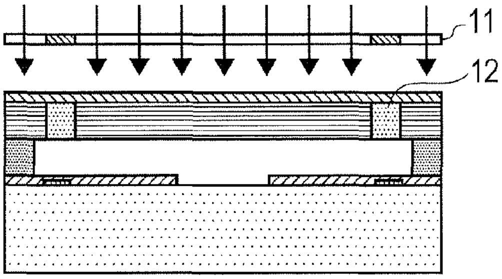

As illustrated in FIG. 2E, the second layer 3 is then subjected to an exposure treatment by using a mask 11 to form a latent image pattern of an ejection orifice having a non-exposed portion 12.

The latent image pattern may be formed in such a manner that, for example, the non-exposed portion 12 becomes an ink ejection orifice pattern.

Figure 2F:
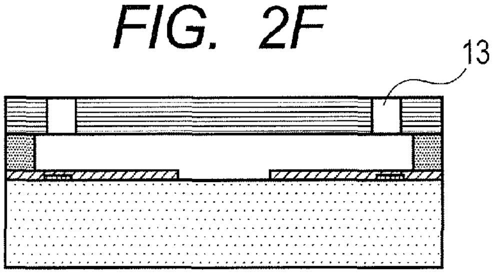

As illustrated in FIG. 2F, a development treatment is then conducted with a developer, whereby the latent image pattern of the second layer 3 is developed to form an ink ejection orifice 13. At this time, the first layer 2 is dissolved in the developer and removed. That is, the latent image pattern is subjected to the development treatment with the developer, thereby forming the ejection orifice and removing at least a part of the first layer from the second layer with the developer at the same time.

As a development solvent contained in the developer, for example, propylene glycol methyl ether acetate (PGMEA), tetrahydrofuran, cyclohexanone, methyl ethyl ketone or xylene may be used. These development solvents may be used either singly or in any combination thereof.

Figure 2G:
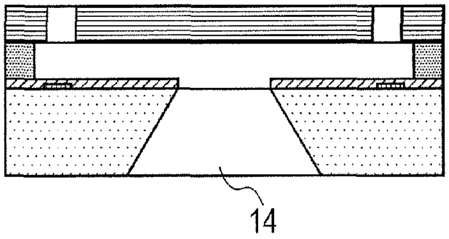

As illustrated in FIG. 2G, etching is then conducted from the side of the back surface of the substrate, whereby an ink supply port 14 that is a piercing aperture for supplying a liquid such as an ink is formed in the substrate 4. The etching is, for example, anisotropic etching.

For example, TMAH (tetramethylammonium hydroxide) or KOH may be used as an etchant. A protecting film may also be provided on the side of the front surface of the substrate for preventing the orifice plate from being damaged upon the etching.

Attachment of an ink supply member for supplying an ink and electrical junction of an electric wiring member for driving the electrothermal conversion element may be conducted with respect to the ink jet recording head produced in the above-described manner (not illustrated).

When the orifice plate is formed with the film according to the production process of the liquid ejection head in this embodiment, the liquid ejection head can be produced without damaging the face surface upon the transfer of the film and the detachment of the support. In addition, according to the production process of the liquid ejection head in this embodiment, the support may be subjected to no releasing treatment, so that this process is also such a production process that the kind of the support may not be selected.

Second Embodiment

A production process according to a second embodiment will hereinafter be described. Incidentally, an example where a first layer contains a soluble resin, and a second layer is a first photosensitive resin layer containing a first photosensitive resin will be described as in the first embodiment.

Figure 3A:
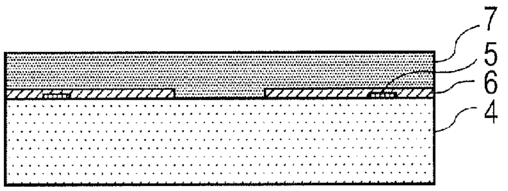
FIGS. 3A, 3B, 3C, 3D, 3E and 3F schematically illustrate a process for producing a liquid ejection head according to a second embodiment.

As illustrated in FIG. 3A, a second photosensitive resin layer 7 is first formed on a substrate such as a silicon substrate having an ejection-energy-generating element 5. For example, a negative photosensitive resin may be used as a material of the second photosensitive resin layer 7.

The second photosensitive resin that is a material of the second photosensitive resin layer 7 is required to have high mechanical strength and ink resistance as a material forming an ink flow path wall. Although the height of an ink flow path is desirably within a range of 5 to 25 μm, the second photosensitive resin is desirably a material capable of forming a layer with good accuracy because the thickness of the second photosensitive resin layer 7 is an important factor for determining a distance between an ink ejection orifice and an energy-generating element. From such a point of view, a cationically polymerized cured product of an epoxy resin is favorably used as the second photosensitive resin. The photosensitive resin layer formed of the cationically polymerized cured product of the epoxy resin has excellent strength, adhesion and solvent resistance and also has excellent patterning properties.

Figure 3D:
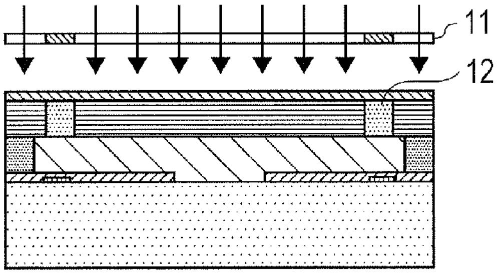
Figure 3B:
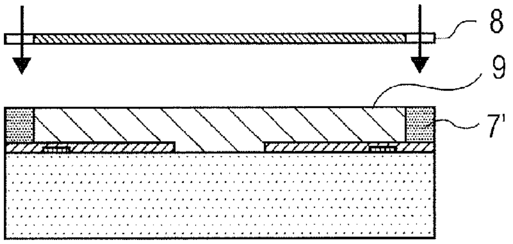

As illustrated in FIG. 3B, the second photosensitive resin layer 7 is then subjected to an exposure treatment by using a mask 8 to form a latent image pattern of an ink flow path having a non-exposed portion 9.

Figure 3E:
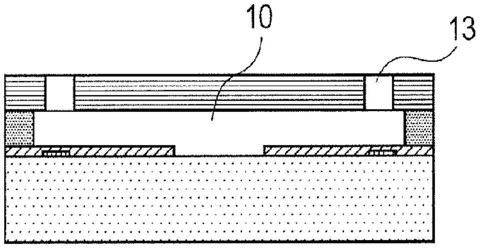
Figure 3C:
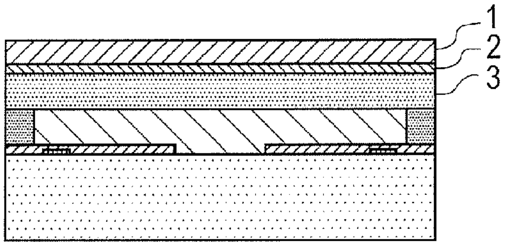

As illustrated in FIG. 3C, the above-described film is then arranged on the substrate in such a manner that a first surface of the substrate faces the second layer 3. More specifically, the film is arranged on the substrate in such a manner that the second layer 3 of the film comes into contact with the second photosensitive resin layer after the latent image pattern has been formed. Thereafter or concurrently, the support 1 is detached from the film.

Examples of a method for arranging the second layer 3 on the second photosensitive resin layer 7 include a lamination method. Upon the transfer, transfer with a roll system or transfer under reduced pressure is desirably conducted taking bubble-discharging ability into consideration. The support is desirably detached in such a manner that the first layer 2 does not cause layer separation. Even if the first layer 2 causes layer separation, however, the face surface of the resulting liquid ejection head comes to be protected because the soluble resin left on the substrate will be removed in a subsequent step.

As illustrated in FIG. 3D, the second layer 3 is then exposed by using a mask 11 to form a latent image pattern of an ejection orifice formed of a non-exposed portion 12.

Upon this exposure, it is desirable to set a difference in sensitivity between the first photosensitive resin layer and the second photosensitive resin layer so as not to expose the second photosensitive resin layer. The photosensitivity of the second photosensitive resin layer is desirably lower than that of the first photosensitive resin layer. Supposing that the photosensitivity of the second photosensitive resin layer is 1, the photosensitivity of the first photosensitive resin layer is favorably 3 or more.

As illustrated in FIG. 3E, the second layer and second photosensitive resin layer after the exposure are then subjected to a development treatment with a developer, whereby an ejection orifice is formed to form an ejection orifice forming member. At this time, the first layer 2 is dissolved in the developer and removed.

Specifically, the first layer 2 is dissolved and removed by immersing the first layer 2 in the developer, and at the same time the non-exposed portion of the second layer and the non-exposed portion of the second photosensitive resin layer are removed to form an ink ejection orifice 13 and an ink flow path 10. That is, the latent image patterns are subjected to the development treatment with the developer, thereby forming the ejection orifice and removing at least a part of the first layer from the second layer with the developer at the same time.

As examples of a solvent of the developer, propylene glycol methyl ether acetate (PGMEA), tetrahydrofuran, cyclohexanone, methyl ethyl ketone and xylene may be mentioned. These solvents may be used either singly or in any combination thereof.

Figure 3F:
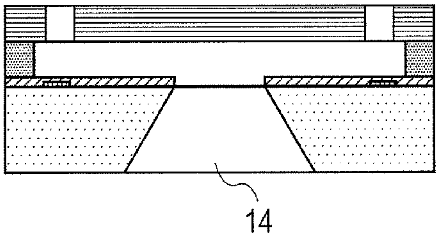

As illustrated in FIG. 3F, etching is then conducted from the side of the back surface of the substrate, whereby an ink supply port 14 that is a piercing aperture for supplying a liquid such as an ink is formed in the substrate 4. The etching is, for example, anisotropic etching.

Attachment of an ink supply member for supplying an ink and electrical junction of an electric wiring member for driving the electrothermal conversion element may be conducted on the ink jet recording head produced in the above-described manner (not illustrated).

EXAMPLES

Example 1

A film was first prepared according to FIGS. 1A and 1B.

First, a solution prepared by dissolving an epoxy resin ("EHPE-3150", product of Daicel Corporation), which is a soluble resin, in a solvent (xylene) was applied on to a PET film which will become a support 1 by a spin coating method to form a soluble resin layer as a first layer 2. Incidentally, the thickness of the soluble resin layer was controlled to 5 μm. A solution prepared by dissolving an epoxy resin ("157S70", product of Japan Epoxy Resin Co., Ltd.) and a photo-initiator ("CPI-210S", product of SAN-APRO LIMITED) having sensitivity at an exposure wavelength of 365 nm upon formation of an ejection orifice in a subsequent step in a solvent (PGMEA) was applied on to this soluble resin layer 2 by a slit coating method to form a first photosensitive resin layer as a second layer 3. Incidentally, the thickness of the first photosensitive resin layer was controlled to 15 μm (Step 1).

A solution prepared by dissolving an epoxy resin ("157S70", product of Japan Epoxy Resin Co., Ltd.) and a photo-initiator ("CPI-210S", product of SAN-APRO LIMITED) having sensitivity at an exposure wavelength of 365 nm in a solvent (PGMEA) was then applied on to a silicon substrate 4 provided with a heating resistor as an ejection-energy-generating element 5 by a spin coating method to form a second photosensitive resin layer 7. This second photosensitive resin layer 7 was then patterned to form an ink flow path wall 7' as illustrated in FIG. 2C (Step 2).

As illustrated in FIG. 2D, the film prepared in Step 1 was then bonded to the substrate by a roll type laminator in such a manner that the first photosensitive resin layer of the film comes into contact with the ink flow path wall 7' formed in Step 2. Thereafter, the support was detached.

As illustrated in FIG. 2E, pattern exposure was then conducted with an exposure of 5,000 $J/m^2$ at an exposure wavelength of 365 nm through a mask 11 by means of an exposer ("FPA-3000i5+", manufactured by Canon Inc.), whereby a latent image pattern was formed on the first photosensitive resin layer in such a manner that a non-exposed portion 12 will become an ink ejection orifice 13.

The soluble resin layer was then immersed in the developer (PGMEA), whereby the non-exposed portion 12 of the first photosensitive resin layer was also removed together with the soluble resin layer as illustrated in FIG. 2F, thereby forming an ink ejection orifice 13.

Further, the temperature of an aqueous solution prepared by diluting TMAH (tetramethylammonium hydroxide) to 22% as an etchant was controlled to 83° C., and the substrate was immersed for 20 hours in this solution, thereby forming an ink supply port 14 in the substrate 4 as illustrated in FIG. 2G. By the above-described process, a liquid ejection head composed of the orifice plate (ejection orifice forming member) 16 and the substrate 15 as illustrated in FIG. 4 was obtained.

Example 2

A film was prepared according to FIGS. 1A and 1B.

First, a solution prepared by dissolving an epoxy resin ("EHPE-3150", product of Daicel Corporation), which is a soluble resin, in a solvent (xylene) was applied on to a PET film which will become a support 1 by a spin coating method to form a soluble resin layer as a first layer 2. Incidentally, the thickness of the soluble resin layer was controlled to 5 μm. A solution prepared by dissolving an epoxy resin ("157S70", product of Japan Epoxy Resin Co., Ltd.) and a photo-initiator ("Irgacure 290", product of Ciba Japan K.K.) having sensitivity at an exposure wavelength of 365 nm upon formation of an ejection orifice in a subsequent step in a solvent (PGMEA) was applied on to this soluble resin layer 2 by a slit coating method to form a first photosensitive resin layer as a second layer 3. Incidentally, the thickness of the first photosensitive resin layer was controlled to 15 μm (Step 1).

A solution prepared by dissolving an epoxy resin ("157S70", product of Japan Epoxy Resin Co., Ltd.) and a photo-initiator ("CPI-210S", product of SAN-APRO LIMITED) having sensitivity at an exposure wavelength of 365 nm in a solvent (PGMEA) was then applied on to a silicon substrate 4 provided with a heating resistor as an ejection-energy-generating element 5 by a spin coating method to form a second photosensitive resin layer 7. This second photosensitive resin layer 7 was then pattern-exposed with an exposure of 5,000 $J/m^2$ at an exposure wavelength of 365 nm through a mask 8 by means of an exposer ("FPA-3000i5+", manufactured by Canon Inc.) as illustrated in FIG. 3B, whereby a latent image pattern was formed in such a manner that a region of a non-exposed portion 9 of the second photosensitive resin layer 7 will become an ink flow path (Step 2).

As illustrated in FIG. 3C, the film prepared in Step 1 was then bonded to the substrate by a roll type laminator in such a manner that the first photosensitive resin layer of the film comes into contact with the second photosensitive resin layer 7 formed in Step 2 after the exposure.

As illustrated in FIG. 3D, pattern exposure was then conducted with an exposure of 500 $J/m^2$ at an exposure wavelength of 365 nm through a mask 11 by means of an exposer ("FPA-3000i5+", manufactured by Canon Inc.), whereby a latent image pattern was formed in such a manner that a non-exposed portion 12 of the first photosensitive resin layer will become an ink ejection orifice 13.

The soluble resin layer 2 was then immersed in the developer (PGMEA), whereby the non-exposed portion 12 of the first photosensitive resin layer and the non-exposed portion 9 of the second photosensitive resin layer 7 were removed together with the soluble resin layer as illustrated in FIG. 3E, thereby forming an ink ejection orifice 13 and an ink flow path 10.

Further, the temperature of an aqueous solution prepared by diluting TMAH (tetramethylammonium hydroxide) to 22% as an etchant was controlled to 83° C., and the substrate was immersed for 20 hours in this solution, thereby forming an ink supply port 14 in the substrate 4 as illustrated in FIG. 3F. By the above-described process, a liquid ejection head composed of a flow path forming member forming an ejection orifice forming member and the substrate 15 as illustrated in FIG. 4 was obtained.

According to the present invention, there can be provided a process for producing a liquid ejection head by using a film to form an ejection orifice forming member, by which the influence of minute irregularities existing in a support of the film can be reduced or relieved.

More specifically, according to the present invention, the influence of the minute irregularities existing in the support can be reduced or relieved by a soluble resin layer formed on the support of the film. Therefore, the liquid ejection head can be produced without damaging the face surface upon the transfer of the photosensitive resin layer to the substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-199388, filed Sep. 11, 2012, which is hereby incorporated by reference herein in its entirety.

What is claimed is:

1. A process for producing a liquid ejection head comprising an ejection orifice forming member in which an ejection orifice for ejecting a liquid has been formed, and a substrate having an ejection-energy-generating element for generating energy for ejecting a liquid from the ejection orifice on the side of a first surface thereof, the process comprising the steps of:

(1) providing a film having a support, a first layer and a second layer in this order, (2) arranging the film on the substrate in such a manner that the second layer faces the first surface followed by detaching the support from the film, (3) forming the ejection orifice in the second layer, and (4) removing at least a part of the first layer from the second layer, wherein the part of the first layer is on a region of the second layer other than a region thereof where the ejection orifice is formed.

2. The process according to claim 1, wherein the second layer is a first photosensitive resin layer containing a photosensitive resin.

3. The process according to claim 2, wherein the second layer is subjected to an exposure treatment, thereby forming a latent image pattern of the ejection orifice, the latent image pattern is subjected to a development treatment with a developer, thereby forming the ejection orifice, and at least a part of the first layer is removed from the second layer with the developer.

4. The process according to claim 3, which further comprises, prior to the step (2), a step of arranging the second photosensitive resin layer on the first surface of the substrate and subjecting the second photosensitive resin layer to an exposure treatment to form a latent image pattern of a liquid flow path communicating with the ejection orifice, wherein in the step (2), the film is arranged in such a manner that the first photosensitive resin layer comes into contact with the second photosensitive resin layer after the exposure, and wherein in the step (4), the latent image pattern of the ejection orifice and the latent image pattern of the liquid flow path are developed with the developer to form the ejection orifice and the liquid flow path at the same time.

5. The process according to claim 4, wherein the second layer is a first photosensitive resin layer containing a photosensitive resin, and photosensitivity of the first photosensitive resin layer is higher than that of the second photosensitive resin layer.

6. The process according to claim 5, wherein supposing that the photosensitivity of the second photosensitive resin layer is 1, the photosensitivity of the first photosensitive resin layer is 3 or more.

7. The process according to claim 3, wherein the first layer is not insolubilized by the exposure treatment for forming the latent image pattern of the ejection orifice.

8. The process according to claim 2, which further comprises, prior to the step (2), a step of arranging a second photosensitive resin layer on the first surface of the substrate followed by patterning, thereby forming a flow path wall forming member forming a lateral wall of a liquid flow path communicating with the ejection orifice, wherein in the step (2), the film is arranged on the substrate in such a manner that the first photosensitive resin layer comes into contact with the flow path wall forming member.

9. The process according to claim 1, wherein the first layer is formed by applying a solution having a viscosity of 5 to 150 CP on to the support by a spin coating method.

10. The process according to claim 1, wherein the first layer is formed in a thickness of 0.5 to 10 μm on the substrate.

11. The process according to claim 1, wherein the first layer contains a resin selected from the group consisting of an epoxy resin, an acrylic resin and a urethane resin.

12. The process according to claim 1, wherein the first layer contains a fluorine-containing compound.

13. The process according to claim 12, wherein the fluorine-containing compound is an organic fluorine-containing surfactant.

14. The process according to claim 13, wherein the organic fluorine-containing surfactant is selected from the group consisting of a perfluoroalkyl ester, a perfluoroalkyl ether, perfluorooctanesulfonic acid and perfluorooctanoic acid.

15. The process according to claim 1, wherein the first layer is formed by using a solution prepared by dissolving a resin in a solvent selected from the group consisting of propylene glycol methyl ether acetate, tetrahydrofuran, cyclohexanone, methyl ethyl ketone and xylene.

16. The process according to claim 1, wherein the support is formed of a material selected from the group consisting of polyethylene terephthalate, polyimide and polyamide.

17. The process according to claim 1, wherein the second layer is formed on the first layer by a curtain coating method.

18. The process according to claim 1, wherein the step (4) comprises removing the first layer that is on the second layer in its entirety.

* * * * *